United States Patent
Enston (10) Patent No.: US 6,698,444 B1
(45) Date of Patent: Mar. 2, 2004

(54) FREEING OF SEIZED VALVES

(76) Inventor: Robert Peter Enston, 26 Dr. Garrett's Drive, Conway LL32 8GZ (GB)

( * ) Notice: Subject to any disclaimer, the term of this patent is extended or adjusted under 35 U.S.C. 154(b) by 0 days.

(21) Appl. No.: 09/979,971

(22) PCT Filed: May 22, 2000

(86) PCT No.: PCT/GB00/01958

§ 371 (c)(1), (2), (4) Date: Jan. 16, 2002

(87) PCT Pub. No.: WO00/71915

PCT Pub. Date: Nov. 30, 2000

(30) Foreign Application Priority Data

May 22, 1999 (GB) .............................................. 9911894

(51) Int. Cl.[7] .......................... F16K 3/36; F16K 37/00; B08B 1/00; B08B 3/12

(52) U.S. Cl. .............................. 137/15.06; 137/15.05; 137/15.13; 137/240; 137/246.11; 137/246.22; 137/318; 137/1; 137/557; 134/22.12; 134/22.18; 134/95.1; 134/98.1; 134/99.1; 134/166 C; 134/169 C; 134/171; 15/104.03; 15/104.05; 184/109; 508/183

(58) Field of Search .................... 15/104.03, 104.05; 134/22.1, 22.11, 22.12, 22.13, 22.14, 22.17, 22.18, 22.19, 94.1, 95.1, 98.1, 99.1, 99.2, 166 C, 169 C, 171; 73/37, 52, 700, 756; 137/1, 15.05, 15.06, 15.13, 240, 242, 246.11, 246.22, 318, 557; 184/71, 74, 82, 109; 116/266, 267; 508/181, 182, 183

(56) References Cited

U.S. PATENT DOCUMENTS

| | | | | |
|---|---|---|---|---|
| 1,980,768 A | * | 11/1934 | Specht | 137/246.22 |
| 2,001,271 A | * | 5/1935 | Smith | 137/240 |
| 2,630,293 A | * | 3/1953 | Smith | 137/246.22 |
| 2,774,363 A | * | 12/1956 | Benzien | 137/240 |
| 2,930,395 A | * | 3/1960 | Eddy et al. | 137/240 |
| 3,175,567 A | * | 3/1965 | Crawford | 134/169 C |
| 3,361,160 A | * | 1/1968 | Alper | 137/57 |
| 3,414,002 A | * | 12/1968 | Volpin | 137/246.22 |
| 3,854,497 A | * | 12/1974 | Rosenberg | 137/557 |
| 4,127,491 A | * | 11/1978 | Reick | 508/183 |
| 4,509,989 A | | 4/1985 | Sumansky | |
| 5,062,439 A | * | 11/1991 | Butler et al. | 137/318 |
| 5,404,905 A | * | 4/1995 | Lauria | 137/557 |
| 5,533,549 A | * | 7/1996 | Sherrman | 137/557 |
| 5,641,731 A | * | 6/1997 | Baumgart et al. | 508/183 |
| 5,763,369 A | * | 6/1998 | Baumgart et al. | 508/183 |
| 5,990,054 A | * | 11/1999 | Willis | 508/183 |
| 6,034,038 A | * | 3/2000 | Lockwood et al. | 508/183 |
| 6,211,121 B1 | * | 4/2001 | Willis | 508/183 |
| 6,305,392 B1 | * | 10/2001 | Tolia et al. | 134/169 C |
| 6,418,960 B1 | * | 7/2002 | Mintz et al. | 137/242 |

FOREIGN PATENT DOCUMENTS

| | | | | |
|---|---|---|---|---|
| FR | 2330284 | * | 5/1977 | ................ 137/242 |
| JP | 52101716 | | 8/1977 | |
| JP | 57028791 | | 2/1982 | |
| JP | 59026681 | | 2/1984 | |
| JP | 59144877 | | 8/1984 | |
| JP | 04145272 | | 5/1992 | |
| JP | 09166226 | | 6/1997 | |

* cited by examiner

*Primary Examiner*—George L. Walton
(74) *Attorney, Agent, or Firm*—Brooks Kushman P.C.

(57) ABSTRACT

In order to free a seized valve, an inspection port is formed in a wall of the valve body and the areas where the valve is seized are determined. One or more injection ports are formed in the valve body adjacent to the seized portions of the valve, pressurized fluid (preferably an insoluble lubricant having a very high cone penetration) is injected through the or each injection port and the injection ports are then closed.

26 Claims, 8 Drawing Sheets

FREEING OF SEIZED VALVES

The present invention relates to the freeing of seized valves and in particular, but not exclusively, to the freeing of seized water valves.

Flow control valves, particularly for controlling the flow of water, are frequently left completely undisturbed in the same position for extended periods of time, sometimes as long as tens of years. The valves may remain in a fully closed or fully open position or in an intermediate position between the two extremes.

When such valves are not regularly actuated it is common for scale to be deposited on the internal components of the valve. The build-up of scale can be so severe that it becomes impossible to actuate the valve, particularly if the valve has not been actuated for many years. The problem occurs with all types of valves including, for example, gate valves, plug valves, ball valves, check valves and butterfly valves.

When it becomes necessary to actuate the valve (for example to isolate a length of pipe to permit repair work to be carried out downstream of the valve) if the valve has become irreversibly stuck by build-up of scale the only solution is to locate an operable valve upstream of the seized valve, close the upstream valve and remove and replace the seized valve. Not only can this inconvenience consumers who might otherwise have retained a normal supply if the seized valve had been operable, but the replacement of the seized valve is a time-consuming and expensive procedure. Moreover, it is rare that the replaced valve can be renovated and it is usually scrapped.

It is an object of the present invention to provide a method of freeing seized valves.

In accordance with a first aspect of the present invention, there is provided a method of freeing a seized valve of the type having a valve housing, an inlet, an outlet, a valve seat within the valve housing between the inlet and the outlet and a valve closure member releasably engageable with the valve seat to control the degree of opening of the valve, the method comprising:

(a) forming one or more injection ports in the wall of the valve housing adjacent to the seized portions of the valve;

(b) injecting a pressurised treatment fluid towards the seized portions of the valve through the or each injection port; and (c) closing off the or each port.

This has been found to free seized valves very effectively and normally obviates the need for removal and replacement of the seized valve.

In one embodiment, the invention further comprises the steps of:

(d) forming an inspection port in a wall of the valve housing; and (e) determining the location of the seized portions of the valve via the inspection port.

Preferably, the location of the seized portions of the valve is determined by investigation of the interior of the valve via the inspection port. The location of the seized portions can be determined visually and/or by means of a probe.

Preferably, wherein, prior to step (b), a pressurised test fluid is applied to the or each injection port to ensure that the port is suitable for undergoing step (b). This ensures that a potentially catastrophic build-up of pressure does not occur when the treatment fluid is injected.

Preferably, the treatment fluid is an anti-scale fluid. It may be a lubricant, with a high cone penetration, e.g. a lubricant in the form of a solid to semisolid dispersion of a thickening agent in a fluid lubricant, such as a grease. The fluid is preferably insoluble in the fluid whose flow the valve is designed to control.

Optionally, the method further comprises inducing vibration in at least a portion of the valve where seizure has occurred.

The vibration frees seized valves very effectively and normally obviates the need for removal and replacement of the seized valve. The technique is particularly useful for dislodging build-ups of scale deposits which are often responsible for seizure of valves.

It has been found that induction of vibration at ultrasonic frequencies is particularly effective. The vibration may be induced by placing an ultrasonic transducer in contact with a portion of the valve (e.g. a valve housing or an internal component of the valve such as a threaded stem or a valve closure gate of a gate valve). Alternatively, or in addition, the vibration may be induced by placing the transducer in contact with a liquid which is itself in contact with a portion of the valve. In particular, the transducer may be passed through an aperture in a valve housing so that it projects into liquid enclosed within the housing.

The vibration of the liquid causes so-called "cavitation" or "cold boiling" of the liquid, which results in rapid formation and implosion of bubbles within the fluid. It is the cavitation of the liquid which is thought to dislodge build-ups of scale deposits.

In accordance with a second aspect of the present invention, a composition for freeing seized valves comprises by weight:

75–90% (preferably 80–85%) polyalphaolefins
3–15% (preferably 6–12%) powdered silica
0.5–5% (preferably 1.5–3%) powdered PTFE
1–6% (preferably 2–5%) di-n-octyl sebecate.

Preferably the composition further comprises a bacteriocide which may, for example, comprise 0.05–1% (and preferably 0.1–0.5%) by weight of the composition.

Preferably the composition further comprises an antioxidant which may, for example, comprise 0.05–1% (and preferably 0.1–0.5%) by weight of the composition.

The present invention also includes a method of freeing a seized valve in accordance with the first aspect, wherein the treatment fluid comprises a composition in accordance with the second aspect.

In accordance with a third aspect of the present invention, there is provided a valve comprising a valve housing, an inlet, an outlet, a valve seat between the inlet and the outlet, a valve closure member releasably engageable with the valve seat to control the degree of opening of the valve and a plurality of ports in a wall of the valve housing at locations where seizure of the valve is anticipated to occur.

If such a valve were to seize at some time in the future, the method of freeing the valve would be simplified, in view of the fact that most, if not all, of the necessary ports would already have been provided on the valve during manufacture. The ports are preferably tapped and would be plugged during normal use of the valve.

By way of example only, specific examples of the present invention will now be described, with reference to the accompanying drawings, in which.

FIGS. 1 to 4 illustrate a gate valve comprising a housing having a main cast iron valve body 10 with an inlet port section 12 and an outlet port section 14 which define a flow passage 15 through the valve. The inlet and outlet port sections 12, 14 are respectively connected, in use, to inlet and outlet pipes 16 and 18 by means of flanges 20 on the inlet and outlet port sections 12, 14 and on the inlet and outlet pipes 16 and 18 respectively which are secured together by means of bolts 22 passing through aligned apertures in the flanges, the bolts being held in position by retaining nuts 24.

Figure 1:
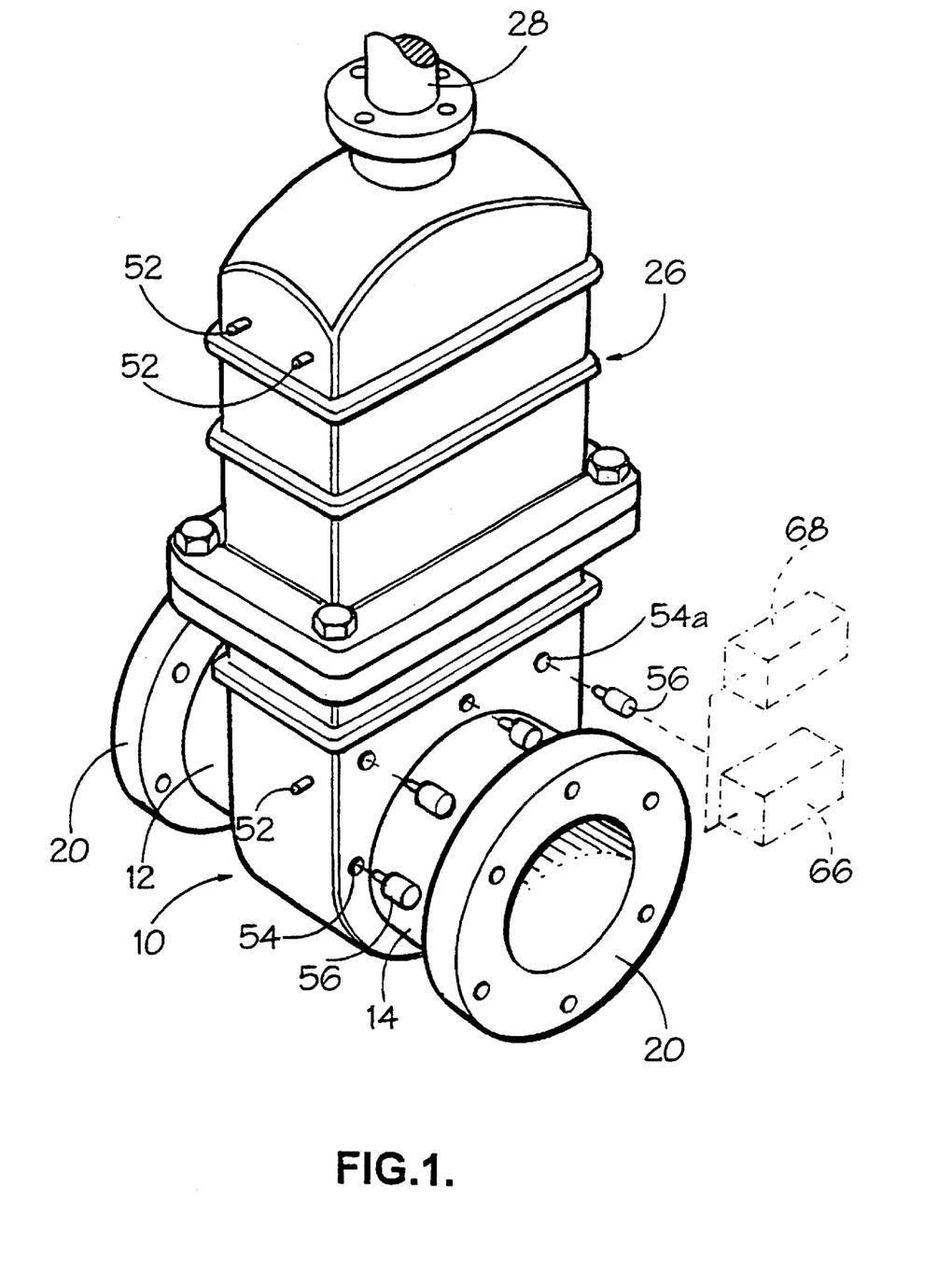
FIG. 1 is a perspective view of a gate valve, illustrating the method of freeing a seized valve in accordance with the present invention.
Figure 2:
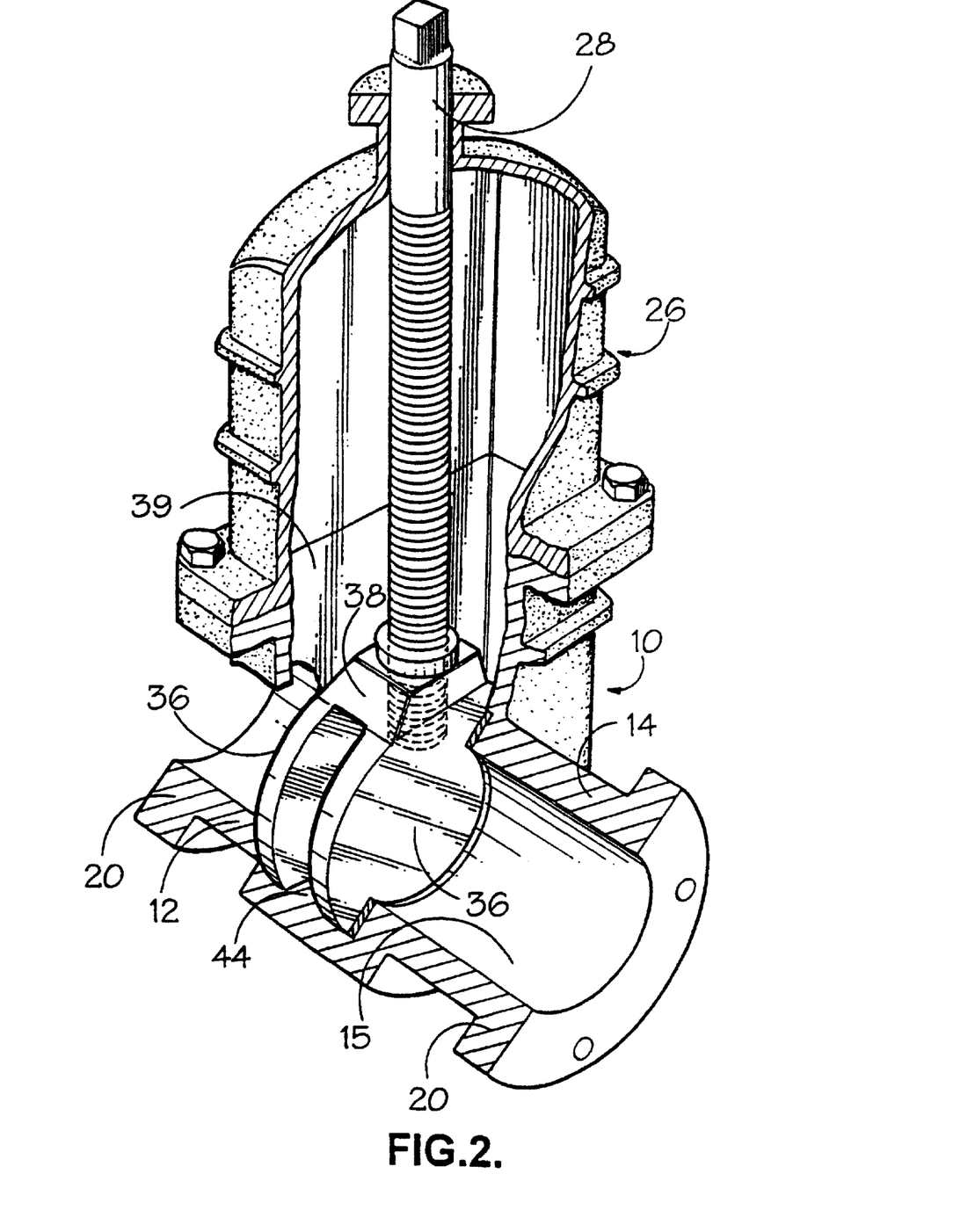
FIG. 2 is a further perspective view of the valve of FIG. 1, partly cut away.
Figure 3:
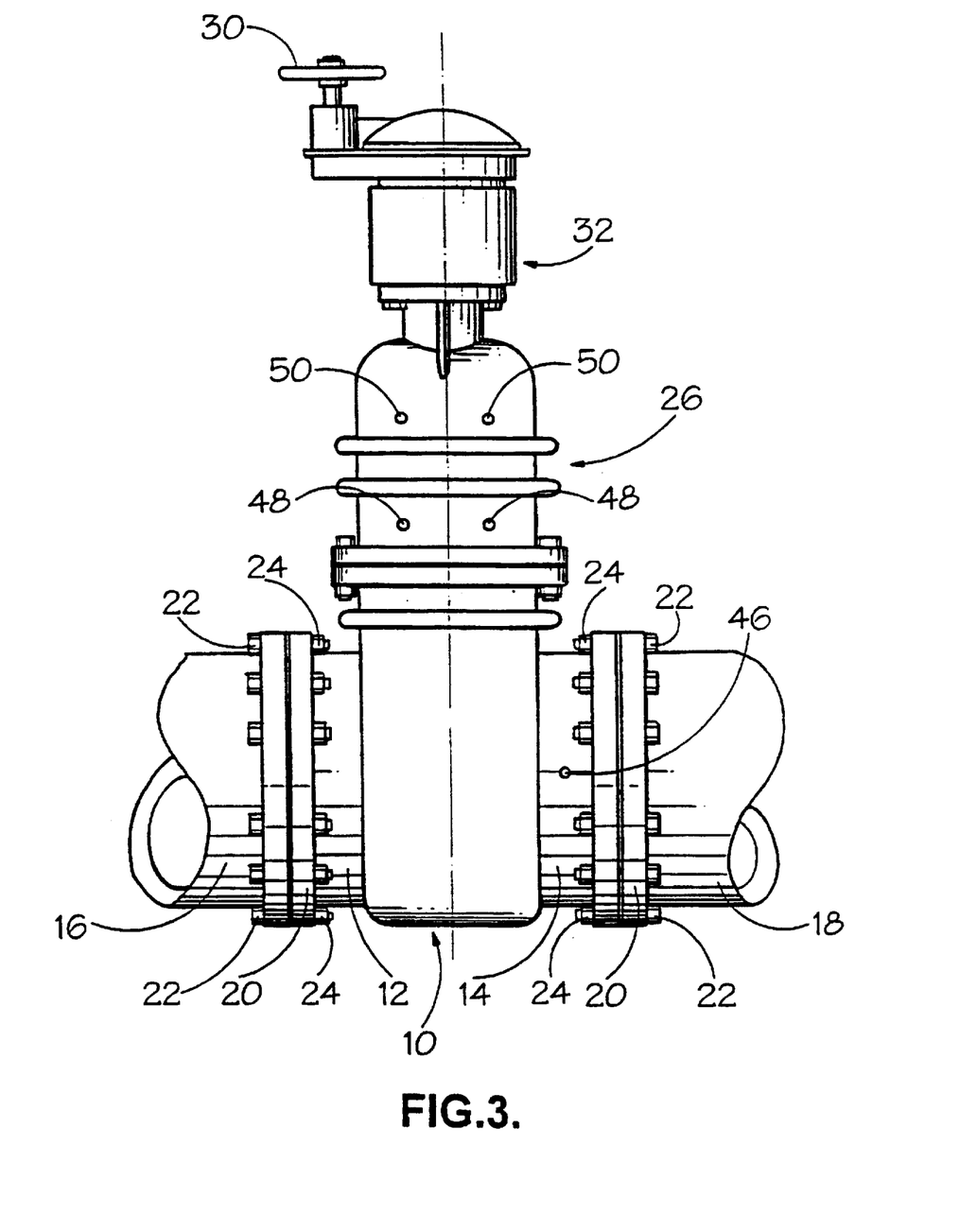
FIG. 3 is a side elevation of the valve illustrated in FIG. 1.

The housing also has a bonnet 26 which projects substantially perpendicularly to the direction of flow of the valve and, as best seen in FIGS. 1 and 3, houses a threaded stem 28 which is rotatable by a hand-actuated wheel 30 via gearing in a gear box 32 secured to the upper end of the bonnet.

The gate valve illustrated in FIGS. 1 to 4 is a non-rising stem valve and further comprises a valve closure member 34 comprising two spaced-apart metal discs 36 joined at their upper end at a collar 38. The collar 38 of the valve closure member threadedly receives the threaded stem 28 and the valve closure member itself is constrained to move in a direction perpendicular to the direction of flow of the valve by a guideway 39 formed in forming the internal walls of the housing. Thus, by rotating the valve stem 28 by means of the hand-operated wheel 30 the valve closure member 34 can be moved between the closed position illustrated in FIG. 3 and an open position in which it is located within the bonnet and out of the flow path of the valve.

Figure 4:
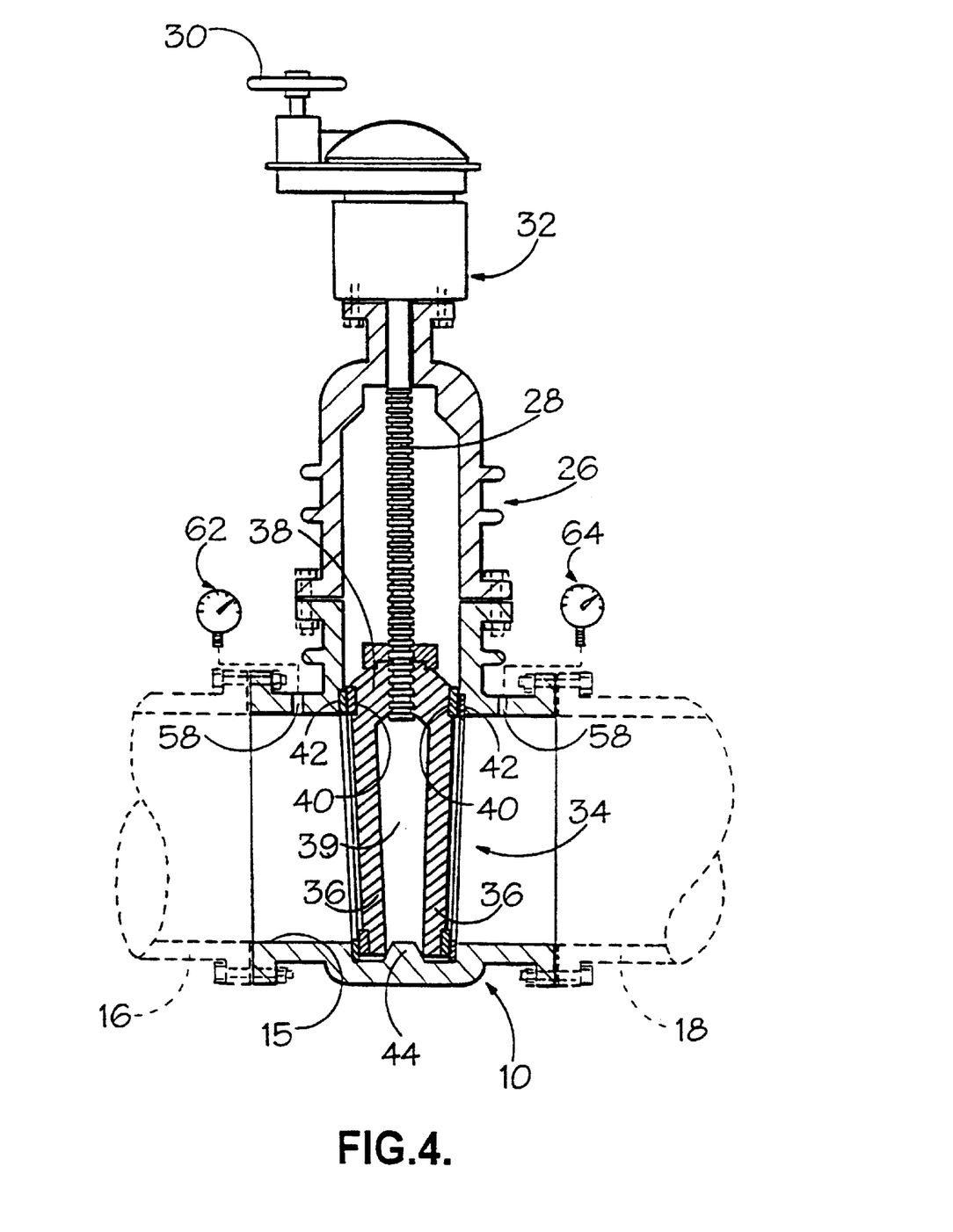
FIG. 4 is a cross-sectional side elevation through the valve of FIG. 1.

As best seen in FIG. 4, the rim of the outer face of each of the metal discs 36 is provided with a sealing ring 40, each of which is engageable with a respective annular valve seat 42 within the valve housing. When the valve closure member 34 is moved to the closed position as illustrated in FIG. 4, the two metal discs 36 engage a wedge 44 on the floor of the housing which forces the metal discs 34 slightly away from each other and into sealing contact with their respective valve seats.

Thus, when the valve has been left unactuated for an extended period of time it is likely that scale will build up on the surfaces between the metal discs 36 and the valve housing, to such an extent that it is not possible to move the valve closure member 34. The problem is particularly acute where the valve is a closed position, as illustrated in FIG. 4, where the sealing surfaces of the valve have been in close contact with one another. However, the problem is present whatever the position of the valve closure member. For example, it will be appreciated that it is possible for scale to build-up over substantially the entire length of the threaded stem 28, thereby making it extremely difficult for it to rotate with respect to the threaded collar 38 of the valve closure member.

The present invention involves a technique for freeing such seized valves. The technique may vary depending upon the type and size of valve but the general principles will be the same.

For the valve described above, the first step in the procedure is to locate the position of the valve gate, if such position is unknown. This involves drilling a pilot hole into the valve body (or bonnet) in the area where the valve gate is thought to be located. In the present case, a suitable location for drilling the pilot hole 46 might be at a point on the side of the valve body, level with the longitudinal axis of the pipes 16, 18 and downstream of the valve seat. The pilot hole 46 should initially be drilled to a depth sufficient to cut an injection port thread and is drilled out to penetrate through the valve body. By means of a videoscope or by insertion of a mechanical probe through the pilot hole, the approximate position of the closure member 34 is established and similarly the thickness of the valve housing wall is also ascertained. The pilot hole 44 is then sealed with a threaded plug.

If the valve closure member is found to be more than 9 inches open, two inspection holes 48 are drilled and tapped one on each side of the valve bonnet centred approximately 3 inches above the top of each gate guide. If the valve gate is in the fully open position ports 48 are located in the gate guides approximately 3 inches below the bottom of the gate, for example as indicated at 50 in FIGS. 1 and 3.

In either case, a videoscope inspection tool stuffing box 52 having a threaded connecting port is secured in each of the inspection ports and an initial visual internal survey of the valve is conducted. On the basis of the visual survey, one or more injection ports 54 are drilled adjacent to the areas of the valve where seizure has occurred and tapped and a non-return valve injection fitting 56 is secured in each injection port. Moreover, upstream and downstream pressure ports 58, 60 are drilled and tapped in the inlet and outlet port sections 12, 14 of the valve body and pressure sensors 62, 64 are secured in the ports.

The next step is to select a port which is proposed to receive pressurised fluid, in order to assist in freeing the seized valve. However, before injecting the fluid a pressure test is carried out at each port with clean, potable water. For example, injection port 54a may be selected as the first port in which case a hydraulic hand pump 66, illustrated schematically in the drawings, is connected to the non-return valve secured in the port and is used to inject the clean potable water. If the pressure as detected at the hand pump immediately returns to the line pressure (as measured by the upstream and downstream pressure sensors 62, 64) it can be assumed that there is an exit path for fluid injected via that port and that it is safe to inject the treatment fluid in order to free the valve. If any injection port fails immediately to return to the line pressure the injectivity test is ceased immediately for that port The non-return valve injection fitting for that port is removed and replaced with a threaded plug and the plug is marked to ensure that it is not used again, in view of the fact that there is no exit path for pressurised fluid entering the valve.

When each of the ports has been tested to ensure that there is an exit path for pressurised fluid, a high pressure pump 68 (illustrated schematically), driven by compressed air, is applied to each of the injection ports in turn and is used to inject an anti-scale liquid at a pressure of between 1000 and 1500 psi. The anti-scale liquid is a water-insoluble lubricant of specific gravity 0.85 to 0.9 with a very high cone penetration, whereby when it is injected at high pressure it adheres to the seized surface of the valve closure member.

One fluid which has been found to work particularly well is a grease-like lubricating anti-scale composition having a specific gravity of 0.89 and having the following constituents (by approximate weight):

75–90%, preferably 80–85%, e.g. 83% polyalphaolefins (a synthetic base oil)

3–15%, preferably 6–12%, e.g. 9% powdered silica 0.5–5%, preferably 1.5–3%, e.g. 2.3% powdered PTFE 1–6%, preferably 2–5%, e.g. 3.5% di-n-octyl sebecate 0.05–1%, preferably 0.1–0.5% e.g. 0.25% bacteriocide 0.05–1%, preferably 0.1–0.5%, e.g. 0.25% antioxidant Such a composition may be pumped. The pumping of the composition loosens scale and degrades the bonding of the scale with the treated valve surfaces. The composition also coats the treated valve surfaces, reducing the likelihood of further build up of scale. When the fluid is applied to all of the surfaces where seizure is thought to have occurred, the lubricating and anti-scaling action will normally allow the valve closure member to be freed from its seized position.

The injection of the anti-scale liquid is carried out for each injection port which has been successfilly tested previously and normally approximately 50 pump strokes are required for each injection. It is also important that at least one other injection port 52 (which has previously been tested with clean, potable water as described above) should remain open whenever the anti-scale fluid is being injected, in order to prevent potentially catastrophic pressure build-up within the valve.

The pressure should be observed after each pump stroke to ensure that there is no dangerous build-up of pressure within the valve. If the injection pressure does not return to the line pressure pumping should be ceased immediately through that port. The residual pump pressure should then be bled off and the hose disconnected from the injection port. The blocked injection port should then be replaced with a plug which should be clearly marked to the effect that the port should not be used subsequently unless a subsequent injectivity test indicates that the blockage has been removed.

Once all areas thought to be seized have been treated, the valve is then actuated and is fully cycled. The anti-scale treatment is then repeated for each unblocked port to remove any remaining scale and to coat the sealing surfaces of the valve closure member with a layer of the viscous lubricant. The valve closure member is then cycled fully three times and is returned to the original position unless it is required to be left in an alternative position.

After the treatment has been finished, the injection ports are replaced with threaded plugs which are secured in the ports which may thereafter be used at some time in the future in the event that seizure occurs again.

Figure 5:
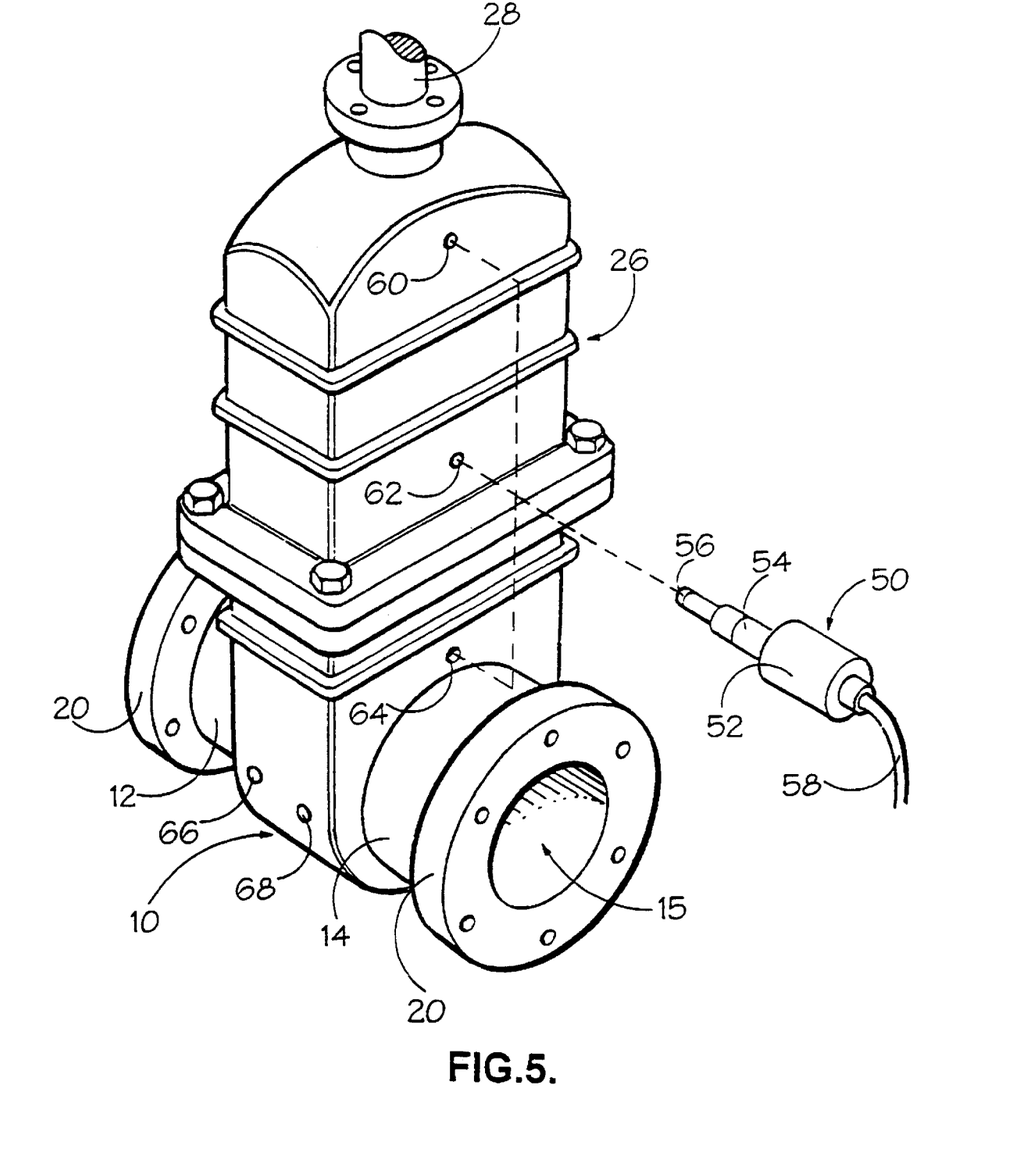
FIG. 5 is a perspective view of the gate valve of FIG. 1, illustrating an optional, additional method of freeing a seized valve in accordance with the present invention.
Figure 6:
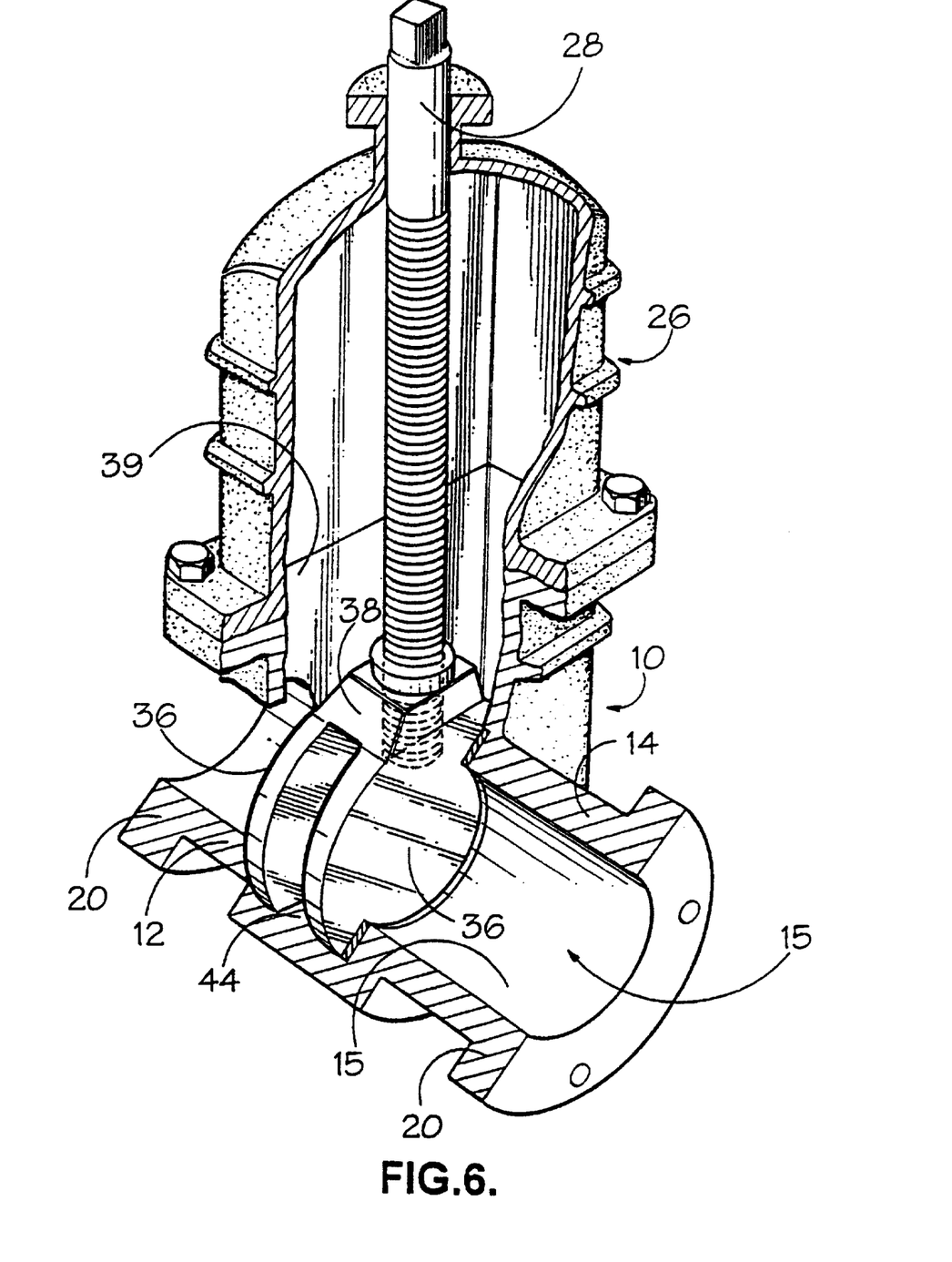
FIG. 6 is a further perspective view of the valve of FIG. 5, partly cut away.
Figure 7:
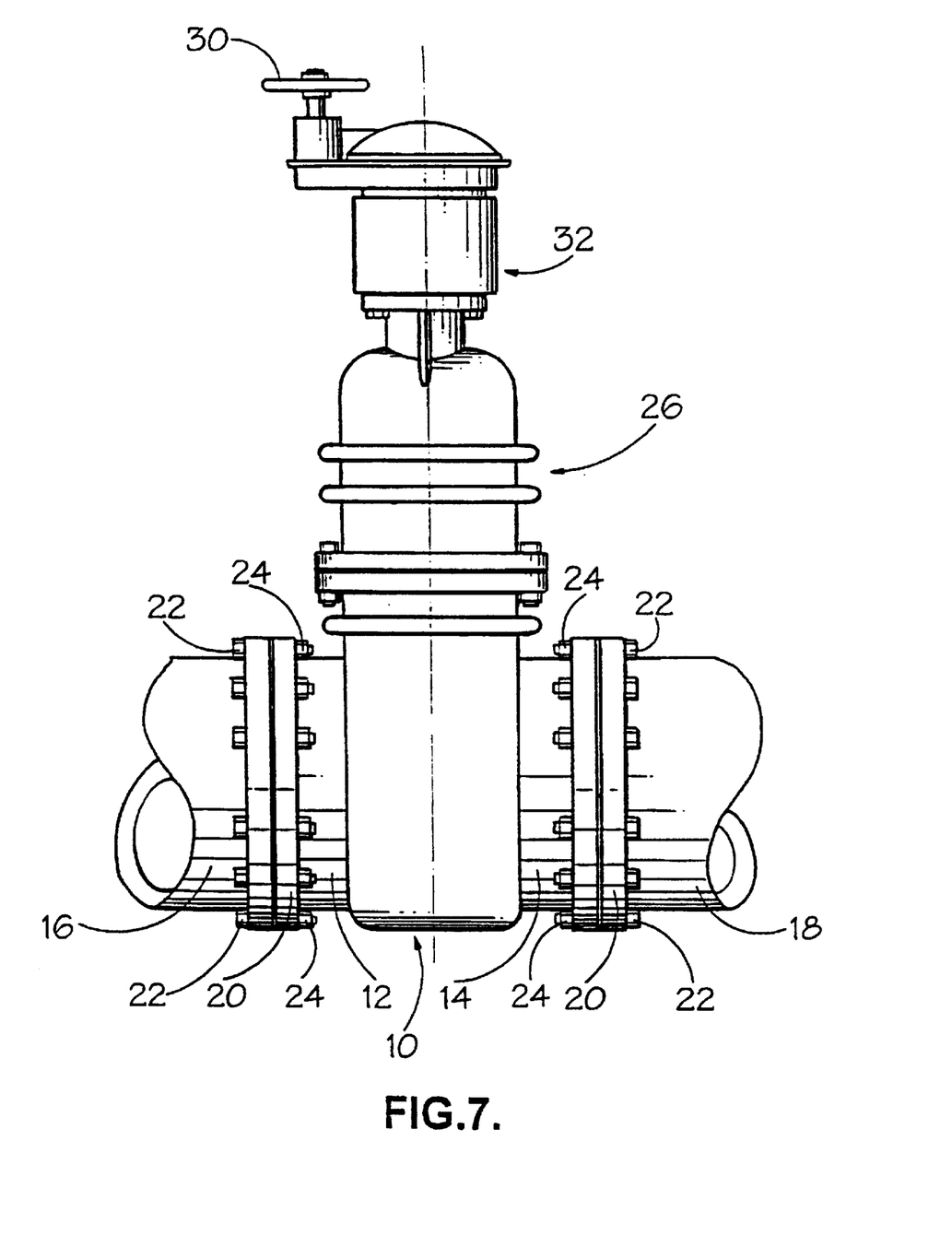
FIG. 7 is a side elevation of the valve illustrated in FIG. 5.
Figure 8:
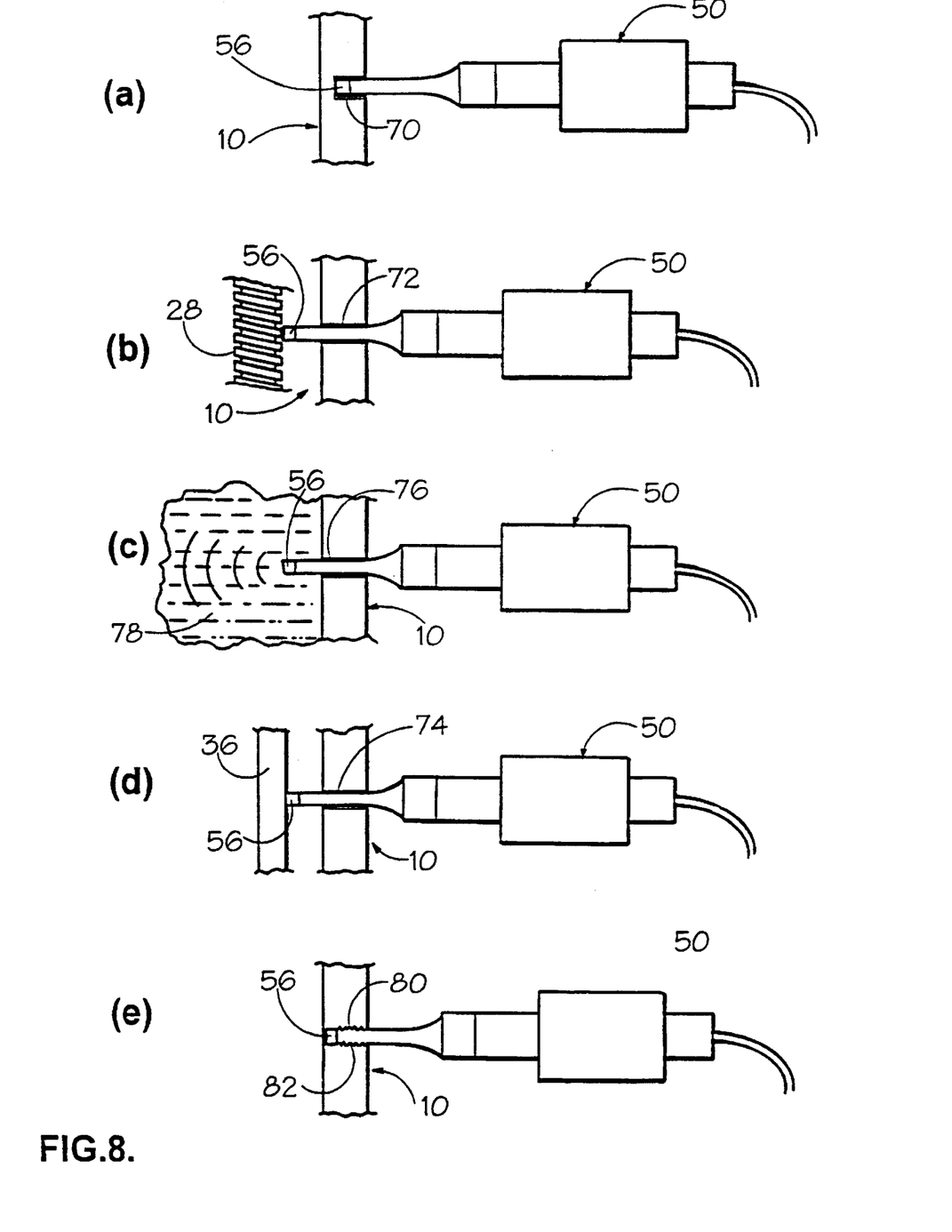
FIGS. 8a to 8e are schematic cross-sections through a portion of the valve of FIG. 5, illustrating variations of the optional, additional method of freeing a seized valve in accordance with the present invention.

In addition to the method described previously (and particularly if the previous method is insufficient to free the valve) vibration may be induced in at least a portion of the valve, as shown in FIGS. 5 to 8. It is thought that the vibration dislodges scale which is often responsible for the seizure valves. In addition it is believed that the vibration displaces one or more components of the valve thereby facilitating movement of the vibrated component or components. Vibration of at least a portion of the valve may be induced in several different ways but, as illustrated in FIG. 5, each involves the use of an ultrasonic transducer 50. A conventional ultrasonic transducer may be used and in the embodiment illustrated a conventional piezoelectric transducer is used, comprising a transducer portion 52 having a horn 54 projecting from one end thereof and a radiating tip 56 at one end of the horn. The transducer 50 is connected to a conventional power supply (not illustrated) which supplies electric current at a desired frequency, via a high-frequency cable 58. The transducer 50 is used to vibrate at least a portion of the valve 10.

In FIG. 5, by way of illustration, the transducer 50 is illustrated as being insertable in one of three bores 60, 62, 64 in one face of the valve but other portions of the valve may be vibrated, for example as indicated by additional ports 66, 68 provided in one side of the valve housing. However, these locations are by way of illustration only and many other possible locations for vibrating a portion of the valve are possible.

However, in general, there are three different methods of vibrating a portion of the valve, as illustrated in FIGS. 8*a* and 8*e*, FIGS. 8*b* and 8*d* and FIG. 8*c* respectively.

In FIG. 8*a*, a blind bore 70 is drilled in an external face of the housing of the valve 10 and the tip 56 is placed in contact with the base of the blind bore 70. It will normally be necessary to hold the transducer 50 firmly in place by means of a conventional clamp (not illustrated) to ensure close abutment of the tip 56 of the transducer 50 with the base of the bore 70, when the transducer is actuated.

The arrangement of FIG. 8*e* is virtually identical to that of FIG. 8*a* except that the portion 80 of the transducer horn 54 adjacent to the tip 56 is externally screw-threaded and is received in a complementarily-threaded blind bore 82 in the housing of the valve. In most cases, this removes the need for a separate clamp. Instead of the threaded blind bore 82, there may be a threaded through bore, whereby one tip 56 of the transducer would project into the water within the valve.

In the arrangements illustrated in FIGS. 8*b* and 8*d*, a bore 72, 74 is drilled right through the housing of the valve 10. In the arrangement illustrated in FIG. 8*b* the tip 56 of the transducer is placed in contact with the threaded stem 28 of the valve whereas in FIG. 8*d* the tip 56 of the transducer 50 is held in engagement with a face of one of the metal discs 36 forming part of the valve closure member 34. In each case, the transducer will normally be held in position by means of a clamp (not illustrated) to ensure that the tip 56 of the transducer is held in firm abutment with the internal component of the valve, during vibration.

As indicated above, the bore 72, 74 may be threaded and adapted to receive a complementarily externally threaded portion of the horn 56 of the transducer, thereby removing the requirement for separate clamping in most cases.

In FIG. 8*c*, a bore 76 extends through a wall of the housing 10 and the transducer 50 is passed through the bore 76 so that the tip 56 is positioned in liquid (normally water) 78 within the valve housing 10. Again, the transducer 50 will normally be held in position by means of a clamp (not illustrated) and it may also be necessary to seal the transducer with respect to the through bore 76, for example by means of sealing rings located around the portion of the transducer 50 projecting through the bore or by means of a curable sealant injected into the bore.

As indicated above, the bore 76 may be threaded in order to receive a complementarily-threaded portion of the horn 54 of the transducer. In most cases, this removes the need for separate clamping of the transducer.

In the arrangement illustrated in FIGS. 8*a* and 8*e*, the transducer vibrates the valve housing which causes the housing, and thereby possibly one or more other components of the valve, to vibrate at ultrasonic frequencies. In the arrangement of FIGS. 8*b* and 8*d* an internal component of the valve is made to vibrate directly but this vibration, in turn, may be transmitted and passed on to other parts of the valve, causing those parts to vibrate. In the arrangement of FIG. 8*c*, the liquid 78 within the valve is caused to vibrate and this liquid passes on the vibrations to one or more components of the valve which will themselves be vibrated and which in turn may pass on the vibration to other components of the valve.

Whichever technique is used, once the transducer has been secured in position it will be switched on and a sweep frequency will normally be applied to the transducer, wherein the frequency of vibration of the transducer will be gradually changed. This maximises the number of components of the valve which will be vibrated at a frequency which is most effective for those components. Of course, if by prior calculation or prior knowledge it is known that a particular frequency is suitable for any particular valve then the transducer may be caused to vibrate only at that frequency.

Vibration of one or more portions of the valve often causes dislodging of scale which is a common cause of valve seizure. It is also believed that the vibration of one or more components of the valve temporarily or permanently reduces friction between seized portions of the valve, thereby making it easier to free those portions with respect to one another.

The invention is not restricted to the details of the aforegoing embodiments. For example, the transducer may be applied at locations other than those illustrated and described above. Moreover, the transducer may be used at more than one location and/or more than one transducer may be used simultaneously. Different types of transducer, e.g. a magnetostrictive transducer, may be used.

Depending upon the type and condition of the valve, it may also be appropriate to drill a pilot hole into the valve body or bonnet in order to locate the position of the valve closure member and/or to assess where the valve is seized, in order to determine the most appropriate position or positions for the transducer or transducers. A videoscope or a mechanical probe may be inserted through the pilot hole in order to carry out this assessment and, if desired, the pilot hole can be sealed with a threaded plug.

Indeed, it may not be necessary to drill any bores, whether blind bores or through bores, in the valve at all. Depending upon circumstances, it may be appropriate merely to place the tip 56 of the transducer in contact with an outer surface of the valve housing or other portion of the valve.

The invention is not restricted to the details of the foregoing embodiments. For example, although the foregoing embodiments have been described with reference to a non-rising gate valve the technique is applicable to all types of valve which are prone to seizure.

It would also be possible to manufacture a valve having the ports already tapped (and plugged) at a plurality of positions on the valve body and/or bonnet which, if the valve were to seize at some time in the future, would simplify the procedure for freeing the valve as described above.

What is claimed is:

1. A method of freeing a seized valve of the type having a valve housing, an inlet, an outlet, a valve seat within the valve housing between the inlet and the outlet and a valve closure member releasably engageable with the valve seat to control the degree of opening of the valve, the method comprising:
   (a) forming one or more injection ports in a wall of the valve housing adjacent to seized portions of the valve;
   (b) injecting a pressurized treatment fluid towards the seized portions of the valve through at least one of the one or more injection ports to free the valve at the seized portions; and
   (c) selectively closing off at least one of the injection ports when fluid is no longer required.

2. A method as claimed in claim 1, further comprising the steps of:
   (d) forming an inspection port in the wall of the valve housing; and
   (e) determining the location of the seized portions of the valve through the inspection port.

3. A method as claimed in claim 2, wherein the location of any seized portions of the valve is determined by investigation of the interior of the valve through the inspection port through a visual inspection tool.

4. A method as claimed in claim 3, wherein the location of the seized portions of the valve is determined by means of a probe.

5. A method as claimed in claim 1, wherein the step of forming the one or more injection ports comprises selectively injecting the treatment fluid through one or more of the injection ports.

6. A method as claimed in claim 1, wherein, during injection of the pressurised treatment fluid through the one or more injection ports, at least one other ports in the valve housing remains open.

7. A method as claimed in claim 1, wherein, prior to step (b), a pressurised test fluid is applied to the one or more injection ports to ensure that the one or more injection ports is suitable for undergoing step (b).

8. A method as claimed in claim 1, wherein the treatment fluid comprises an anti-scale fluid.

9. A method as claimed in claim 8, wherein the anti-scale fluid is a lubricant.

10. A method as claimed in claim 8, wherein the anti-scale fluid has a high cone penetration.

11. A method as claimed in claim 8, wherein the fluid is substantially insoluble in the fluid whose flow the valve is designed to control.

12. A method as claimed in claim 1, further comprising inducing vibration in at least a portion of the valve where any seized portion is located.

13. A method as claimed in claim 12, comprising vibration at ultrasonic frequencies.

14. A method as claimed in claim 13, comprising placing an ultrasonic transducer in contact with a portion of the valve.

15. A method as claimed in claim 14, comprising placing the transducer in contact with the valve housing.

16. A method as claimed in claim 14, comprising placing the transducer in contact with an internal component of the valve.

17. A method as claimed in claim 14, comprising placing the transducer in contact with a liquid which is itself in contact with a portion of the valve.

18. A method as claimed in claim 17, comprising passing a transducer through an aperture in the valve housing so that it projects into liquid enclosed within the housing.

19. The method of claim 1 wherein step (b) includes providing the pressurized treatment with a weight composition of:
   75–90% polyalphaolefins
   3–15% powdered silica
   05.–5% powdered PTFE
   1–6% di-n-octyl sebecate.

20. The method of claim 19, wherein the pressurized treatment fluid comprises by weight:
   80–85% polyalphaolefins
   6–12% powdered silica
   1.5–3% powdered PTFE
   2–5% di-n-octyl sebecate.

21. The method of claim 19, wherein the pressurized treatment fluid further comprises a bacteriocide.

22. The method of claim 21, wherein the pressurized treatment fluid comprises 0.05–1% bacteriocide by weight.

23. The method of claim 22, wherein the pressurized treatment fluid comprises 0.1–0.5% bacteriocide by weight.

24. The method of claim 19, wherein the pressurized treatment fluid further comprises an antioxidant.

25. The method of claim 24, wherein the pressurized treatment fluid comprises 0.05–1% antioxidant by weight.

26. The method of claim 25, wherein the pressurized treatment fluid comprises 0.01–0.5% antioxidant by weight.

* * * * *